United States Patent [19]

Ohwada et al.

[11] 3,740,731

[45] June 19, 1973

[54] ONE TRANSISTOR DYNAMIC MEMORY CELL

[75] Inventors: Atsushi Ohwada, John A. Arnold, both of Houston, Tex.

[73] Assignee: Texas Instruments Incorporated, Dallas, Tex.

[22] Filed: Aug. 2, 1971

[21] Appl. No.: 168,324

[52] U.S. Cl. ........... 340/173 CA, 307/238, 307/279

[51] Int. Cl. ........................ G11c 11/40, G11c 11/24

[58] Field of Search ................ 340/173 R, 173 CA; 307/238, 279

[56] References Cited

UNITED STATES PATENTS

| | | | |
|---|---|---|---|
| 3,533,089 | 10/1970 | Wahlstrom | 340/173 R |
| 3,387,286 | 6/1968 | Dennard | 340/173 R |
| 3,634,825 | 1/1972 | Levi | 340/173 CA |
| 3,641,512 | 2/1972 | Frohman-Bentchkowsky | 340/173 R |
| 3,656,119 | 4/1972 | Baker | 340/173 R |
| 3,665,423 | 5/1972 | Nakanuma et al. | 340/173 R |
| 3,683,335 | 8/1972 | Cricchi et al. | 340/173 R |
| 3,691,535 | 9/1972 | Williams | 340/173 R |

*Primary Examiner*—Stanley M. Urynowicz, Jr.
*Attorney*—Samuel M. Mims, Jr., James O. Dixon, Andrew M. Hassell et al.

[57] ABSTRACT

A dynamic memory storage cell requires only one field effect transistor to store binary data. The data is represented in the form of stored charge utilizing the inherent metal-insulator-semiconductor capacitance and P-N junction capacitance at the source node of the field-effect transistor. An extended portion of the source diffusion in combination with overlying thin oxide and metal layers form a capacitor that further enhances charge storage. A matrix of the memory cells form an extremely high density random access memory.

3 Claims, 9 Drawing Figures

*INVENTORS*
*Atsushi Ohwada*
*John A. Arnold*

BY Richard R Donaldson

ATTORNEY

ONE TRANSISTOR DYNAMIC MEMORY CELL

This invention pertains to data storage systems in general and more specifically to a one transistor dynamic data storage cell.

Data information storage systems utilizing insulated gate field-effect transistor(IGFET)circuits as storage elements have become increasingly popular due to the inherent advantages of the IGFET structure. For example, such structures are generally less expensive to manufacture and may be produced with higher packing density than equivalent circuits utilizing bipolar transistors. IGFET circuits have been advantageously utilized, e.g., in a random access memory (RAM). While the IGFET structure enables relatively high packing density there is continuing emphasis being placed upon further reducing the area on the semiconductor slice required for each storage cell and also for increasing the yield of IGFET devices in a circuit. One factor that reduces the yield is related to the number of gates required to produce a given function, since the metal or conductive region on the thin insulator tends to short to the semiconductor material underneath. It may be seen that by reducing the number of gates required for a specific function, the yield may be improved.

A conventional random access memory cell comprises a static latch, i.e., a flip-flop. Such a circuit, however, utilizes a relatively large amount of surface area on a semiconductor chip. In an effort to reduce this area it has been proposed to use a dynamic type of random access memory cell which requires only three IGFETs. In this type of circuit, the store information must be refreshed every cycle. While such a dynamic random access memory cell significantly reduces the surface area of the semiconductor chip, still smaller memory cells are desirable. More information relative to the three transistor dynamic RAM cell may be found in a paper by Regitz et al. published in the ISSCC Digest, p.42 Feb. 18, 1970, Philadelphia, Pa.

Accordingly, an object of the present invention is to produce a random access memory cell requiring a minimum of surface area of the semiconductor chip.

A further object of the present invention is to provide a one transistor dynamic memory cell.

Another object of the present invention is to provide a one transistor dynamic memory cell having enhanced capacitance to facilitate charge storage.

A further object of the present invention is to provide a dynamic random access memory having increased yield.

In accordance with the present invention, a dynamic data storage cell comprises a single IGFET wherein binary data is represented in the form of stored charge utilizing the inherent metal-insulator - semiconductor (MIS) capacitance and P-N junction capacitance at the source node of the field-effect transistor. An extended portion of the source diffusion of the IGFET and overlying thin insulating and metal layers form a capacitance that further enhances the charge storage capability. A matrix of the memory cells defines an extremely high density random access memory. The drains of all IGFETs in a column are commonly connected to a data input line while the gates of all IGFETs in a row are connected to a switch that enables selective activation of respective rows of the matrix. An IGFET refresh circuit is coupled to each column of the matrix to refresh the stored charge in each cell of the RAM during each cycle of operation. Switching means in each column of the matrix enable writing information into and reading information from a selected cell of the matrix when a specific column switch and row switch are simultaneously energized to provide access to a selected memory cell.

FIG. 1 schematically and in block diagram form depicts a random access memory utilizing the single IGFET memory cell of the present invention;

FIG. 2 schematically depicts the single transistor memory cell of the present invention and the associated refresh and enabling circuitry;

Figure 1:
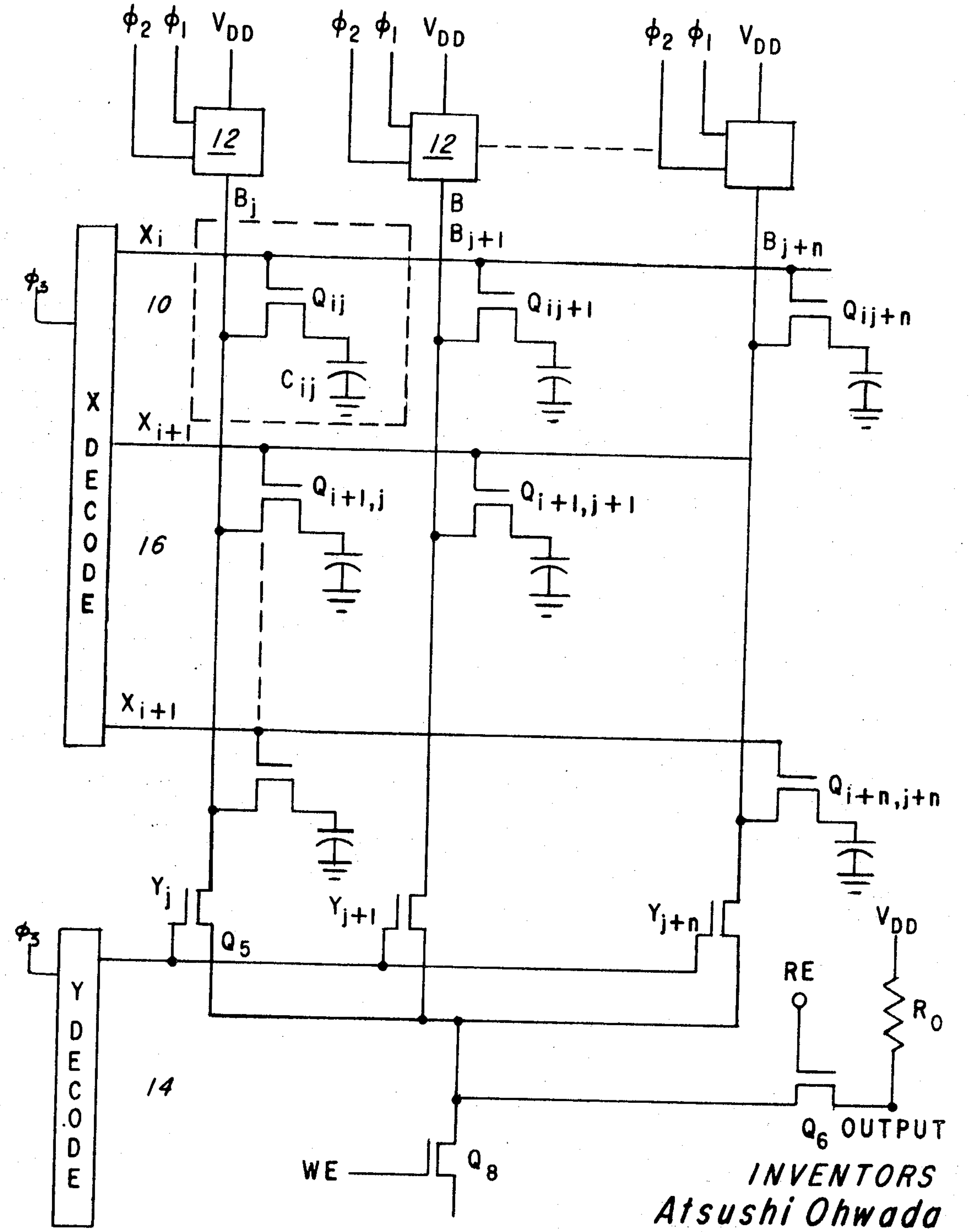

With reference now to FIG. 1, a random access memory system incorporating the one transistor dynamic memory cell of the present invention is illustrated. A basic one transistor memory cell is illustrated within the block formed by the dashed line 10. The RAM includes a matrix of storage cells 10 arranged in rows and columns; various rows of the matrix being labeled as lines $X_i$, $X_{i+1}$, $\cdots X_{i+n}$, while various columns of the matrix are illustrated by the data lines $B_j$, $B_{j+1}$, $\cdots$ $B_{j+n}$. As may be seen, all of the IGFET's memory cells in a row have their bases connected to a row control line such as $X_i$, while all of the IGFET/memory cells in a column have drains commonly connected to a data line such as $B_j$. Each column data line is connected to data refreshing circuitry shown generally at 12. The refresh circuitry has a $V_{DD}$ voltage source connected thereto and two clock inputs $\phi_1$ and $\phi_2$. As will be explained hereinafter during the discussion of FIG. 2, the refresh circuitry 12 is operative to refresh the stored data in each memory cell 10 during a cycle of operation.

Each column data line also has switching means such as transistor $Q_5$ to provide access to that data line for reading and writing operations. The base of the transistor forming the switching means for each column data line is connected to Y decode means illustrated generally at 14. Access to a specific cell in the RAM is obtained when the base of a column enable switch, such as the base $Y_j$ of transistor $Q_5$ is activated simultaneously with activation of a row enable line such as $X_{i+l}$. The row enable lines $X_i$, $X_{i+l}$ and $X_{i+n}$ are activated by X decode means 16. Thus, by way of example, when the base $Y_j$ of transistor $Q_5$ is activated simultaneously with the row line $X_{i+l}$ the transistor $Q_{i+l,\ j}$ is uniquely selected in the matrix of memory cells, and at this time information may be written into this memory cell or read out of the memory cell, as will be explained hereinafter. Various X and Y decode circuits are well known in the art. One decode circuit that may be utilized in accordance with the present invention is illustrated in FIG. 8.

Figure 2:
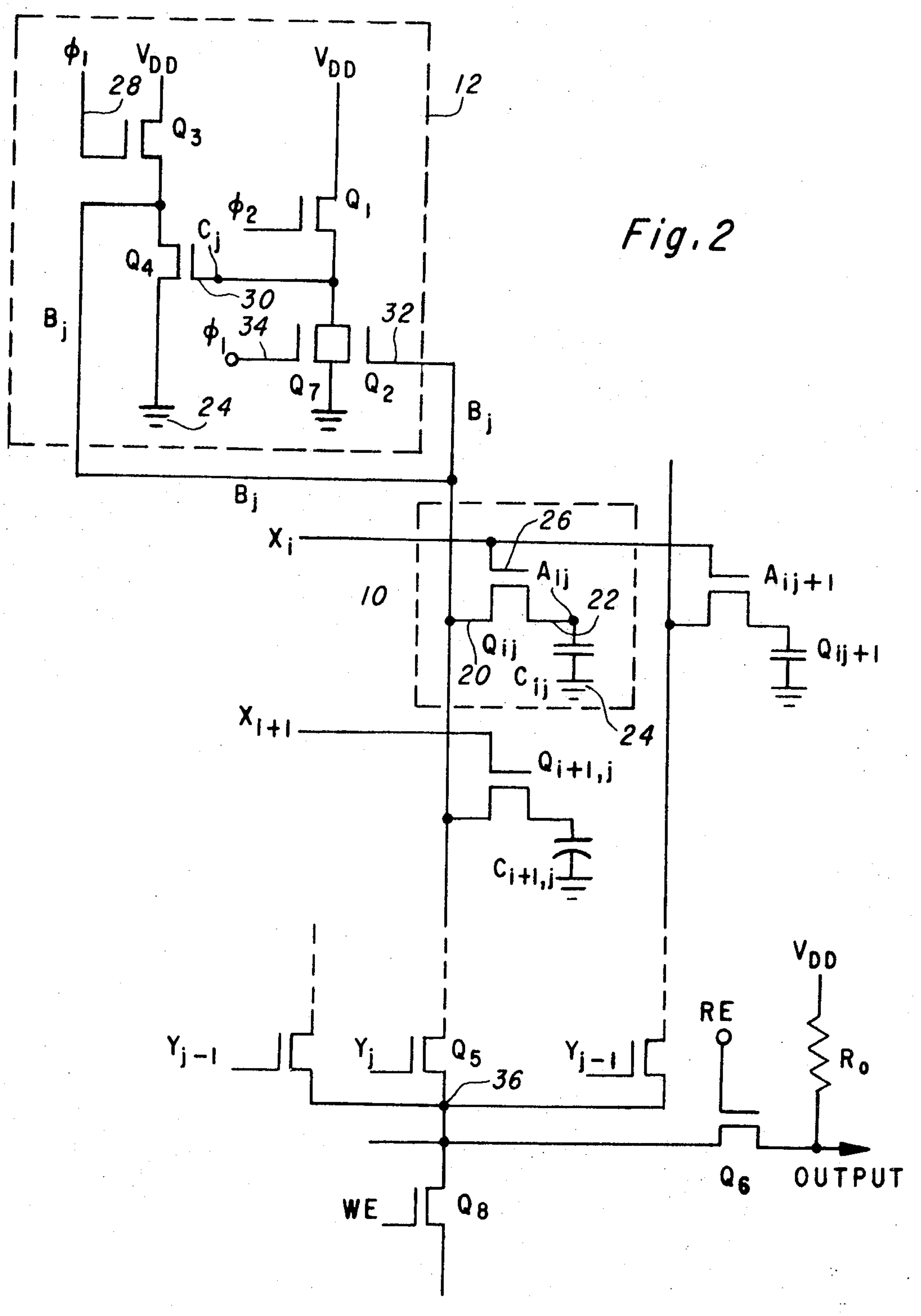

FIG. 2 schematically represents one column of data storage cells 10 with the associated refresh circuitry 12, column enable switch $Q_5$ and read enable transistor $Q_6$ and write enable transistor $Q_8$. Each memory cell 10 comprises an IGFET such as transistor $Q_{ij}$. The drain 20 of the transistor $Q_{ij}$ is connected to the data line $B_j$ and the source 22 is connected through a capacitance $C_{ij}$ to circuit ground 24, which, for example, may be the substrate of an integrated circuit structure. Data is stored by the memory cell 10 in the form of stored charge at the node $A_{ij}$. The gate 26 of transistor $Q_{ij}$ is connected to the control line $X_i$ which is connected to the X decode circuitry 16 (FIG. 1).

By way of example, the refresh circuitry 12 for each column data line is illustrated as including transistors $Q_1$, $Q_2$, $Q_3$, $Q_4$, and $Q_7$. It is to be understood, of course, that this refresh circuit is by way of illustration only, and that other refresh circuits known to those skilled in the art may be utilized if desired. The refresh circuitry illustrated in FIG. 2 includes, for each column, two IGFET series inverters of which the input and output are tied to data line $B_j$. The source-drain circuits of transistor $Q_3$ and $Q_4$ are connected in series between circuit ground 24 and a voltage $V_{DD}$. This voltage supply may be either negative or positive depending upon whether N-channel or P-channel devices are used and may generally be in the range of 12 volts for high threshold devices. The juncture of transistors $Q_3$ and $Q_4$ is connected to the column data line $B_j$. The gate 28 of transistor $Q_3$ is connected to a first clocking signal $\phi_1$. The source-drain circuits of transistors $Q_1$ and $Q_2$ are also series connected between the voltage supply $V_{DD}$ and circuit ground. The juncture between the transistors $Q_1$ and $Q_2$ is connected to the base 30 of transistor $Q_4$. The capacitance at this node will be referred to hereinafter as $C_j$. The gate 32 of transistor $Q_2$ is connected to column data line $B_j$. An additional transistor $Q_7$ is connected in parallel with the source-drain circuit of transistor $Q_2$. The base 34 of transistor $Q_7$ is connected to clocking signal $\phi_1$.

Each column enable or column switching means may comprise an IGFET such as $Q_5$ having a source-drain circuit connected in series with the corresponding column data line such as $B_j$. The base $Y_j$ of transistor $Q_5$ is connected to Y decode means 14 (FIG. 1). The column enable switches in the matrix have a common node 36 connected to write enable (WE) and read enable (RE) devices $Q_8$ and $Q_6$ respectively.

Figure 3:
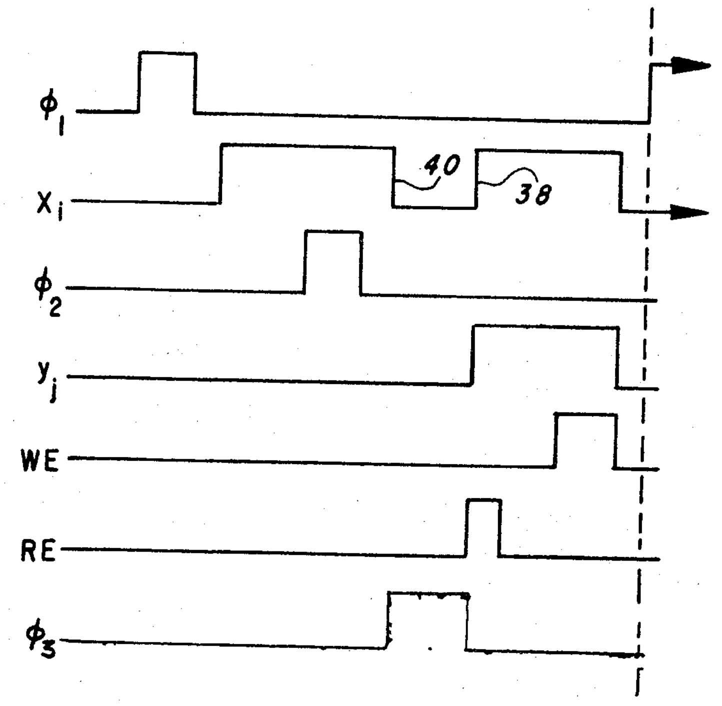
FIG. 3 is a plot of various wave forms that may be utilized during operation of the random access memory illustrated in FIG. 1.

With reference to FIGS. 2 and 3, operation of the single transistor memory cell of the present invention will now be described. In FIG. 3, the waveforms required to effect one cycle of operation of the dynamic random access memory are illustrated. In general, the cycle can be divided into two portions, a first portion wherein the stored data in each cell of the random access memory is refreshed, and a second portion wherein the data stored in a selected memory cell may be operated upon, i.e., data may be read from the cell and/or written into the cell.

The refresh cycle is initiated by application of clock-pulse $\phi 1$ to the base 28 of transistor $Q_3$ and to the base 34 of transistor $Q_7$. Clock $\phi_1$ biases on transistor $Q_7$ and insures that the capacitance $C_j$ at the base 30 of transistor $Q_4$ is discharged, insuring that transistor $Q_4$ remains biased off. Clock pulse $\phi_1$ also biases on transistor $Q_3$ enabling application of the voltage supply $V_{DD}$ to the column data storage line $B_j$, charging the capacitance of this line to a high value. The clock pulse $\phi 1$ is then terminated, leaving data line $B_j$ in a "high" condition and leaving the capacitance $C_j$ in a "low" or ground state condition. During this sequence, all of the column data lines $B_j$ through $B_{j+n}$ are charged to a high condition. In the next step of the cycle a row enable line of the matrix, such as $X_i$, is activated — i.e., brought high. This couples all of the transistors in that row of the matrix to corresponding column data lines. For clarity of description, the conditions associated with only one of the transistors, $Q_{ij}$ will be discussed. At the time that line $X_i$ is activated, two conditions must be considered. First, the data previously stored in the memory cell comprising $Q_{ij}$ may have been a logic "1" or high level. For this situation, the data line $B_j$ discharges very little into the transistor $Q_{ij}$, since the node $A_{ij}$ is already charged to a high value. Thus, the gate 32 of transistor $Q_2$ remains at a high value, clamping the base 30 of transistor $Q_4$ to circuit ground. The second situation to be considered is where no data or a logic 0 was stored by the node $A_{ij}$. For this situation, the data line $B_j$ discharges into the transistor $Q_{ij}$. If the capacitance of the data line $B_j$ equals the capacitance at node $A_{ij}$, $B_j$ will discharge until its voltage equals the voltage at node $A_{ij}$. This voltage is below the threshold for biasing on transistor $Q_2$ (assuming that the capacitance at node $A_{ij}$ is sufficiently large).

In the next step of the refresh cycle, clock-pulse $\phi_2$ is brought high biasing on transistor $Q_1$. For the situation where a "1" had previously been stored in the memory cell comprising $Q_{ij}$, transistor $Q_2$ is biased on supplying a ready path for $V_{DD}$ to circuit ground. Thus the capacitance $C_j$ at the gate 30 of transistor $Q_4$ remains low and transistor $Q_4$ remains biased off, leaving the data line $B_j$ high, refreshing the stored charge at node $A_{ij}$. On the other hand, where a logic "0" had previously been stored at the node $A_{ij}$, transistor $Q_2$ is not biased on, and in response to the clock $\phi 2$ the voltage V supply $V_{DD}$ charges the capacitance $C_j$ at the gate 30 of transistor $Q_4$. This connects the data line $B_j$ to circuit ground through the source drain circuit of transistor $Q_4$, assuring that the node $A_{ij}$ is discharged to a low value thereby refreshing the "0" stored at that location. Clock $\phi_2$ is then turned off terminating the refresh cycle. A similar procedure is followed for each row data line $X_i$ through $X_{i+n}$.

In the second portion of the cycle the data stored in a selected cell of the matrix of the RAM may be operated upon. Assume for example, that it is desired to read the data stored in the cell $Q_{ij}$. This may be accomplished by bringing the row data input line $X_i$ high as indicated in the region 38 at the $X_i$ waveform in FIG. 3. This couples the column data input line $B_j$ to the transistor $Q_{ij}$. Concurrently with bringing the data line $X_i$ high, one of the column data lines $B_j$ through $B_{j+n}$ is selected by Y select switches such as transistor $Q_5$. By applying a high signal to the base $Y_j$ of transistor $Q_5$, the column $B_j$ is selected for data operation. It is understood, of course, that in order to select a specific memory cell only one column line and only one row line of the memory matrix may be concurrently energized during read and write operations. Assuming for purposes of example that transistor $Q_5$ is biased on by a gate signal $Y_j$ and that the data memory cell comprising transistor $Q_{ij}$ is coupled to the data line $B_j$ by activating the row data line $X_i$, then the data content or the data stored at the node $A_{ij}$ may be read by applying a read enable (RE) signal to the base of transistor $Q_6$. For the situation where a "0" is stored at the node $A_{ij}$, it will be recalled that during the refresh cycle the capacitance $C_j$ at the gate 30 of transistor $Q_4$ is charged high. Thus, transistor $Q_4$ remains in a biased on condition after termination of the refresh cycle. Upon application of the read enable signal to transistor $Q_6$, current from the source $V_{DD}$ flows through output resistance $R_0$ through the source-drain circuits of transistor $Q_6$, $Q_5$ and $Q_4$ to circuit ground 24. Presence of an output voltage across the output resistance $R_0$ represents a logic "0."

Consider the situation, on the other hand, where a "1" is stored at the node $A_{ij}$. It will be recalled that at termination of the refresh cycle the node 30 of transistor $Q_4$ has a low capacitance $C_j$, due to the path to ground through transistor $Q_2$, and thus transistor $Q_4$ remains off. Now, activating the read enable signal has no effect, i.e., there is no path to circuit ground for $V_{DD}$, and thus, there is an absence of current flow through resistance $R_0$ and no output voltage is generated. Absence of an output voltage is equated to a logic "1" stored at the node $A_{ij}$.

To write information into, i.e., store a charge at the node $A_{ij}$, the memory cell is selected for data operation as previously explained, i.e., $X_i$ and $B_j$ are simultaneously activated. A write enable (WE) signal is applied to the base of transistor $Q_8$ to connect the line $B_j$ to the input data source. For the situation where a "1" had previously been stored in the selected data cell, such as the data cell containing transistor $Q_{ij}$, the data line $B_j$ is isolated from circuit ground, since transistor $Q_4$ remains in the off condition after the refresh cycle. Thus, the desired data may be written into the node $A_{ij}$ by applying either a high signal or a low signal through the source-drain of transistor $Q_8$. Consider, however, the situation where a "0" had previously been stored in the selected data cell. As previously explained, for this situation the data line $B_j$ is connected to circuit ground through transistor $Q_4$ upon termination of the refresh cycle. Thus, when it is desired to write, for example, a "1" into the node $A_{ij}$, a path is provided for current through transistor $Q_8$, $Q_5$ and through transistor $Q_4$ to ground. It will be noted, however, that the source-drain circuit of $Q_4$ provides a resistance and thus, the voltage level V of $B_j$ rises as current is dissipated through this resistance. As soon as the level $B_j$ rises to the threshold value of transistor $Q_2$, this transistor is biased into conduction and the node $C_j$ discharges to circuit ground, thereby turning off transistor $Q_4$. This enables the line $B_j$ to become charged to the level required for writing a logic "1" into the node $A_{ij}$.

Figure 4:
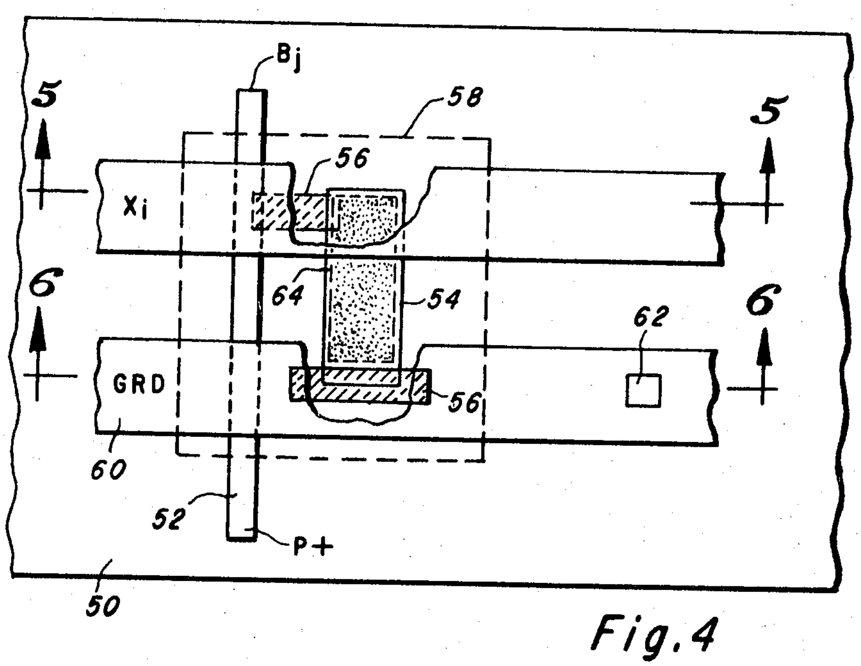
FIG. 4 is a partially cut away plan view illustrating the IGFET and enhanced capacitance structure of the dynamic memory cell.
Figure 5:
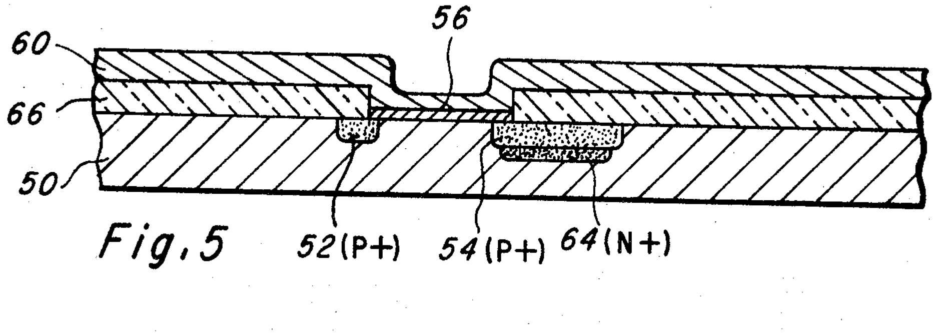
FIG. 5 is a cross-section along the lines 6—6' of FIG. 4.
Figure 6:
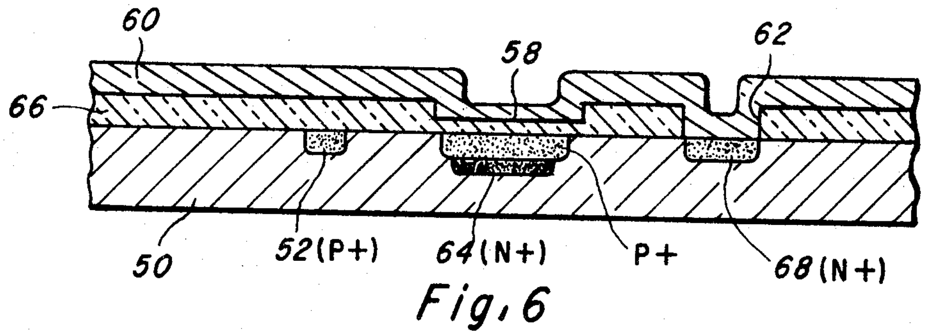
FIG. 6 is a cross-section view along the lines 7—7' of FIG. 4.

With reference to FIGS. 4 – 6, the structure of the one transistor memory cell of the present invention may better be understood. A semiconductor substrate of, e.g., silicon is shown generally at 50. The substrate may be either N-type or P-type depending upon design considerations. For purposes of illustration, hereinafter it will be assumed that an N-type substrate is utilized. The substrate may, for example, have an impurity concentration on the order of $10^{15}$ atoms/cm.$^3$. A column input line $B_j$ is shown in the region 52 as an elongated P+ diffused region. This region will form, for example, the drain contact for all of the field-effect transistors in a column. A second P+ diffused region is shown at 54, and is preferably formed substantially parallel to the diffused region 52. The region 54 forms the source contact of the field-effect transistor. A relatively thick insulating layer 66, of e.g., silicon dioxide having a thickness on the order of 10,000 A overlies the substrate 50. The layer 66 has thin regions in the areas denoted 56 and 58 which, may, e.g., be on the order of 500 A in thickness. The thickness of the insulating layers will of course depend somewhat on design considerations. The semiconductor material under the thin oxide area 56 defines a channel between the regions 52 and 54. A conductive strip $X_i$ overlies the thin oxide region 56 and forms the gate of the FET. When a plurality of the memory cells enclosed by the dashed line 58 are used to define a matrix, such as in a RAM, the strip $X_i$ may form the row address means. Since the capacitance of the line $B_j$ is relatively high when several transistors are formed in a column, it is desirable to have the capacitance between the source contact 54 and the substrate 50 to be as large as the capacitance of the line $B_j$. This capacitance may be increased by forming a second thin insulating region 58 over a portion of the diffused region 54. It will be noted that this does not define a FET since the oxide region does not bridge the area between the P+ drain diffused region 52 and the P+ source diffused region 54. A conductive strip 60 labeled "ground" (GRD) is formed to overlie the second thin oxide region 58. The conductive strip — oxide — P+ region 54 form a capacitor. To complete the capacitor circuit it is necessary that the strip 60 contact the substrate 50 in some area. This may be accomplished for example by the via hole shown diagramatically at 62 through the thick oxide 66. Also, it may be desirable to increase the P-N junction capacitance of the source region by forming an N+ region 64 between the substrate 50 and P+ region 54. The N+ region is shown by the dotted lines 64 (FIG. 4), and may, e.g., have an impurity concentration on the order of $10^{17}$ atoms/cm$^3$.

Conventional IGFET fabrication techniques may be utilized to form the structure shown in FIGS. 4-6. Such techniques are well known to those skilled in the art and need not be described in more detail herein.

Figure 7:
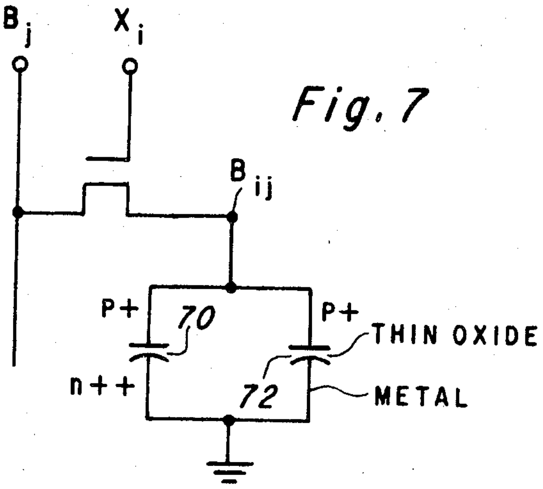
FIG. 7 is a schematic representation of the enhanced capacitance at the source node of the IGFET memory cell of the present invention.

With reference to FIG. 7, an equivalent schematic circuit of the structure shown in FIGS. 4–6 is illustrated. Data is stored at the node $B_{ij}$. This node is formed to have a relatively high capacitance resulting from the inherent metal-insulator-semiconductor capacitance and P-N junction capacitance. The capacitance 70 is illustrated to include the P-N junction capacitance between the P+ source diffusion 54 and N+ region 64 thereunder (FIG. 5). The capacitor 72 is formed by the P+ region of the source forming one plate of the capacitor, the dielectric of the capacitor being formed by the thin oxide region and the metal strip 60 forming the other plate of the capacitor. The capacitor is completed by connecting the metal strip to circuit ground.

Figure 8A:
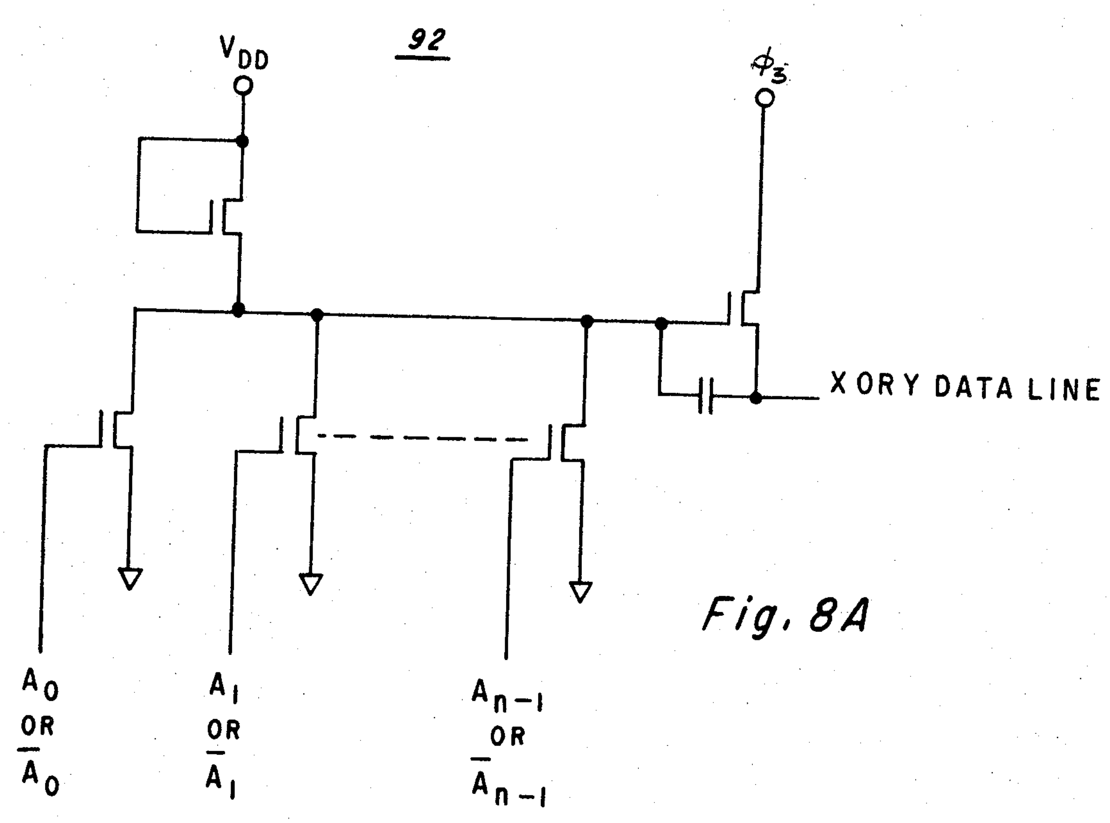
FIGS. 8A and 8B are a schematic of a decode circuit that may be used in the memory system of FIG. 1.
Figure 8B:
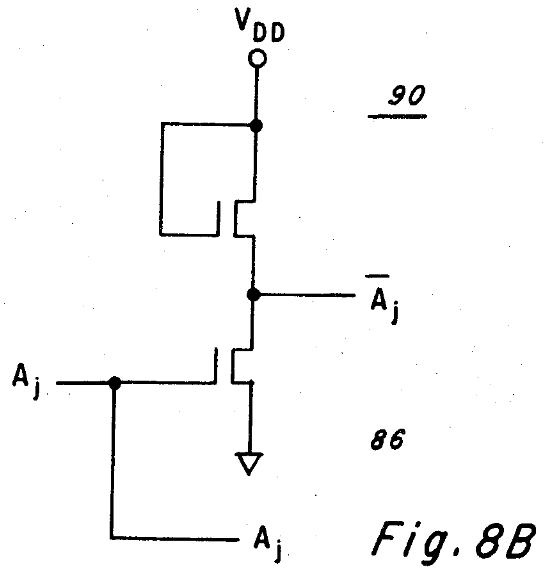

With reference to FIGS. 8a and 8b, a decode circuit suitable for use with the present invention is illustrated. For each input signal $A_j$ an input buffer such as shown generally at 90 generates a true and an inverted signal, $A_j$ and $A_j$ respectively. A separate NAND circuit such as shown at 92 is used to gate each line of the memory matrix, both *x* and *y*. For example, in a 16 × 16 memory array, four input signals may be used to uniquely select one of the 16*x* input lines and one of the 16*y* input lines, uniquely selecting one of the 256 memory cells. For each of the data lines of the matrix a four input NAND circuit may be utilized. Each NAND configuration correspond to the data code of one of the address lines.

An advantage of the present invention results from the fact that only one FET device is required for each cell of the random access memory. This advantage may better be appreciated when compared to the aforementioned three transistor dynamic random access memory cell. In accordance with the present invention, the same function, i.e., dynamic storage of data, may be accomplished with only about 50 percent of the semiconductor area required for the three field-effect transistor dynamic cell. In addition, the area of thin oxide required is only about 55 percent of that required for the three transistor dynamic cell. By reducing the area required for the thin oxide regions, the yield will be substantially improved, inasmuch as one of the major problems with FET devices results from forming metal over thin oxide regions.

Although various embodiments of the present invention have been described with particularity, it is to be understood that modifications to the details of construction may be made without departing from the scope and spirit of the invention.

What is claimed is:

1. A dynamic data storage system comprising in combination:

a. a row and column matrix of dynamic storage cells, each cell being capable of storing binary data in the form of stored charge, respective cells including a single field-effect transistor, the gate of which is connected to a row enable line, the drain of which is connected to a column enable line and an extended portion of the source of which forms one plate of a capacitor coupling said source to circuit ground, the drains of all field-effect transistors of storage cells in a column being commonly connected and the gates of all FETs of storage cells in a row being commonly connected, a low resistivity region underlying the extended portion of the source to enhance capacitance between source and circuit ground;

b. decoding means for randomly addressing selected cells;

c. circuit means coupled to said decoding means for refreshing the charge stored in each cell of said matrix during each operating cycle; and d. input/output means for selectively writing information into and reading information from said matrix.

2. A dynamic data storage system as set forth in claim 1 wherein said decoding means includes a field-effect transistor connected in series with each column data input line, each transistor having a gate for selectively biasing on the column data line associated therewith.

3. A dynamic data storage system comprising in combination:

a. a row and column matrix of dynamic storage cells, each cell being capable of storing binary data in the form of stored charge, respective cells including a single field-effect transistor, the gate of which is connected to a row enable line, the drain of which is connected to a column enable line and an extended portion of the source of which forms one plate of a capacitor coupling said source to circuit ground, the drains of all field-effect transistors of storage cells in a column being commonly connected and the gates of all FETs of storage cells in a row being commonly connected;

b. decoding means for randomly addressing selected cells;

c. circuit means coupled to said decoding means for refreshing the charge stored in each cell of said matrix during each operating cycle; and d. input/output means for selectively writing information into and reading information from said matrix; and e. said refreshing circuit means comprises for each column data line:

i. a first FET, one node of which is coupled to a voltage source and the gate of which is connected to first clocking means;

ii. a second transistor connected in series with the other node of said first transistor, the second node of said second transistor being connected to circuit ground and the juncture of said first and second transistors being connected to said column data line;

iii. a third transistor having one node connected to a voltage source and a gate electrode connected to a second clocking means;

iv. a fourth field-effect transistor, the source and drain of which are connected in series between the other node of said third transistor and circuit ground and the gate of which is connected to said column data line, the juncture of said third and fourth transistors being connected to the gate of said second transistor; and v. a fifth FET, the source and drain of which are connected in parallel to the source and drain of said fourth transistor and the gate of which is connected to said first clocking means.

* * * * *